United States Patent

Silkowski et al.

[11] Patent Number: 5,882,693
[45] Date of Patent: Mar. 16, 1999

[54] FLUID ASSIST VALVE-GATE BUSHING WITH CONCENTRIC PIN MEMBERS

[75] Inventors: George Silkowski, Holly; Scott Greb, Clinton Township, both of Mich.

[73] Assignee: Incoe Corporation, Troy, Mich.

[21] Appl. No.: 774,583

[22] Filed: Dec. 31, 1996

[51] Int. Cl.⁶ ........................... B29C 45/17
[52] U.S. Cl. ............ 425/130; 264/328.8; 264/572; 425/546; 425/564
[58] Field of Search ............... 425/130, 132, 425/133.1, 533, 546, 564, 566; 264/572, 328.8, 328.9, 328.12, 328.13

[56] References Cited

U.S. PATENT DOCUMENTS

| 3,947,175 | 3/1976 | Melcher | 425/130 |
| 3,947,177 | 3/1976 | Eckardt | 425/130 |
| 3,972,664 | 8/1976 | Fillmann | 425/132 |
| 4,657,496 | 4/1987 | Ozeki et al. | 425/130 |
| 5,135,703 | 8/1992 | Hunnerberg et al. | 264/328.12 |

*Primary Examiner*—Patrick Ryan
*Assistant Examiner*—Joesph Leyson

[57] ABSTRACT

Apparatus for fluid-assisted injection molding systems or co-injection molding systems. A pair of concentric movable pin members are positioned in a mold bushing and selectively controlled to facilitate or prevent the passage of molten plastic material and a fluid into the mold cavity. An inner pin member is positioned within a hollow pin member and both pin members are controlled by piston members which are selectively moved in a block member by selective pressurization from a hydraulic or pneumatic source. Movements of the piston members selectively controls the operation of the pin members and thus the operation of the fluid-assisted injection molding system.

5 Claims, 3 Drawing Sheets

FLUID ASSIST VALVE-GATE BUSHING WITH CONCENTRIC PIN MEMBERS

TECHNICAL FIELD

The present invention relates to pin-type valve-gate bushing devices for use with fluid-assisted injection molded systems.

BACKGROUND OF THE INVENTION

There are many processes and techniques today for fluid-assisted (gas or liquid) injection molding. Fluid-assisted injection molding processes have added flexibility to the design and manufacture of plastic parts with their ability to produce partially hollow, lightweight, rigid parts with minimal sink marks and less tendency to warp. These processes can reduce material requirements, as well as equipment costs and cycle time, and thus have advantages over conventional injection molding processes and techniques in many applications.

In general, fluid-assisted injection molding systems utilize another material, either in a liquid or gaseous state, under pressure to expand the plastic material in the mold and conform it to the mold cavity details. The liquid or gaseous fluid can be introduced into the mold in several ways, such as through a bushing, nozzle, or machine nozzle in one or more cavities, or in more than one location. In conventional plastic injection molding processes, the molten plastic material is injected through sprue bushings or nozzles (heated or unheated) into the cavities of hollow molds. Often, two or more sprue bushings attached to a common manifold are used. In this instance, the plastic melt coming from the injection molding machine through runners is distributed by a heated distributor block (a/k/a manifold) to the individual sprue bushings. One conventional method used to control the melt flow utilizes one or more pin or needle valves, also known as valve-gate bushings.

With these systems, a needle valve is inserted through the manifold into the sprue bushing and controlled for axial movement by a hydraulic, electric or pneumatic control device or mechanism. The needle valve has an elongated pin which is moved axially by the control mechanism and is adapted to fit within an orifice in the end of the sprue bushing in order to open and close the passageway of plastic melt from the sprue bushing into the mold cavity. One of these systems is shown, for example, in U.S. Pat. No. 4,279,582.

Another type of plastic injection molding method and system utilizes a co-injection apparatus. This apparatus injects two different plastic materials, typically an inner core material and an outer shell material, into a single mold cavity. A co-injection manifold receives material from two different injection machines and combines the two materials into a single stream that flows into a mold or die.

Co-injection processes create a product which is less expensive. A smaller amount of the more expensive outer plastic material is used for the final part, since it only is used for the outer surface or shell of the product. The second material which is co-extruded is typically a less expensive plastic material and forms the inner non-visible core of the product. A co-injection manifold and process are shown, for example, in U.S. Pat. No. 4,376,625.

SUMMARY OF THE INVENTION

It is an object of the present invention to provide an improved valve-gate bushing for use with a fluid-assisted injection molding process. It is also an object of the present invention to provide an improved valve-gate bushing which can be alternately used for a co-injection apparatus and system.

It is another object of the present invention to provide an improved valve-gate bushing or nozzle with a movable gate pin which can close off the entry of plastic material into the mold, and at the same time allow entry of pressurized fluid (liquid or gas) therein. It is a still further object of the present invention to provide a valve-gate bushing which has a dual-pin mechanism which can be selectively operated to permit or close off the entry of plastic material into the mold and similarly permit or close off the entry of the fluid-assist material into the mold.

The present invention overcomes the prior difficulties with valve-gate-type bushings or nozzles used with fluid-assisted systems, and fulfills the objects and purposes noted above. The present invention provides a pin-type valve-gate device which easily and effectively opens and closes the flow of plastic material into the mold as desired, and also equally easily and effectively opens and closes the entry of fluid (gas or liquid) into the mold cavity.

In particular, the bushing has a movable shutoff mechanism which operates a dual pin mechanism to selectively open and close the bushing orifice as well as the orifice formed in the ends of the pin members. A first movable elongated pin member is positioned inside a second movable elongated pin member. A piston-type control mechanism, which is operated either hydraulically, electrically, pneumatically, or the like, selectively moves the two pin members longitudinally either together, or relatively to one another, to selectively open and close the two valve members (orifices). The end of the outer pin member mates with the orifice in the end of the bushing or nozzle member creating a valve or "gate" for entry of plastic material into a mold cavity. The end of the inner pin member creates a second valve mechanism with the inner end of the outer pin member. This valve mechanism is used to regulate the flow of the second fluid material, such as a liquid or gas, into the mold cavity.

In a preferred embodiment, each of the pin members is secured to stacked separately movable piston members which are positioned in a control mechanism. The two pistons are moved together or independently, thus resulting in the desired movement of the two pins relative to each other and relative to the sprue bushing.

In a second embodiment, one piston member is positioned inside the other piston member and the two piston members are again adapted to move in the same direction or in opposite directions, thus regulating the valve mechanism at the end of the two pin members, as well as the valve mechanism at the gate in the sprue bushing.

These and other objects, features and benefits of the invention will become apparent from the following description of the invention, when taken together in view of the accompanying drawings and appended claims.

BEST MODE(S) FOR CARRYING OUT THE INVENTION

Figures 1, 2:
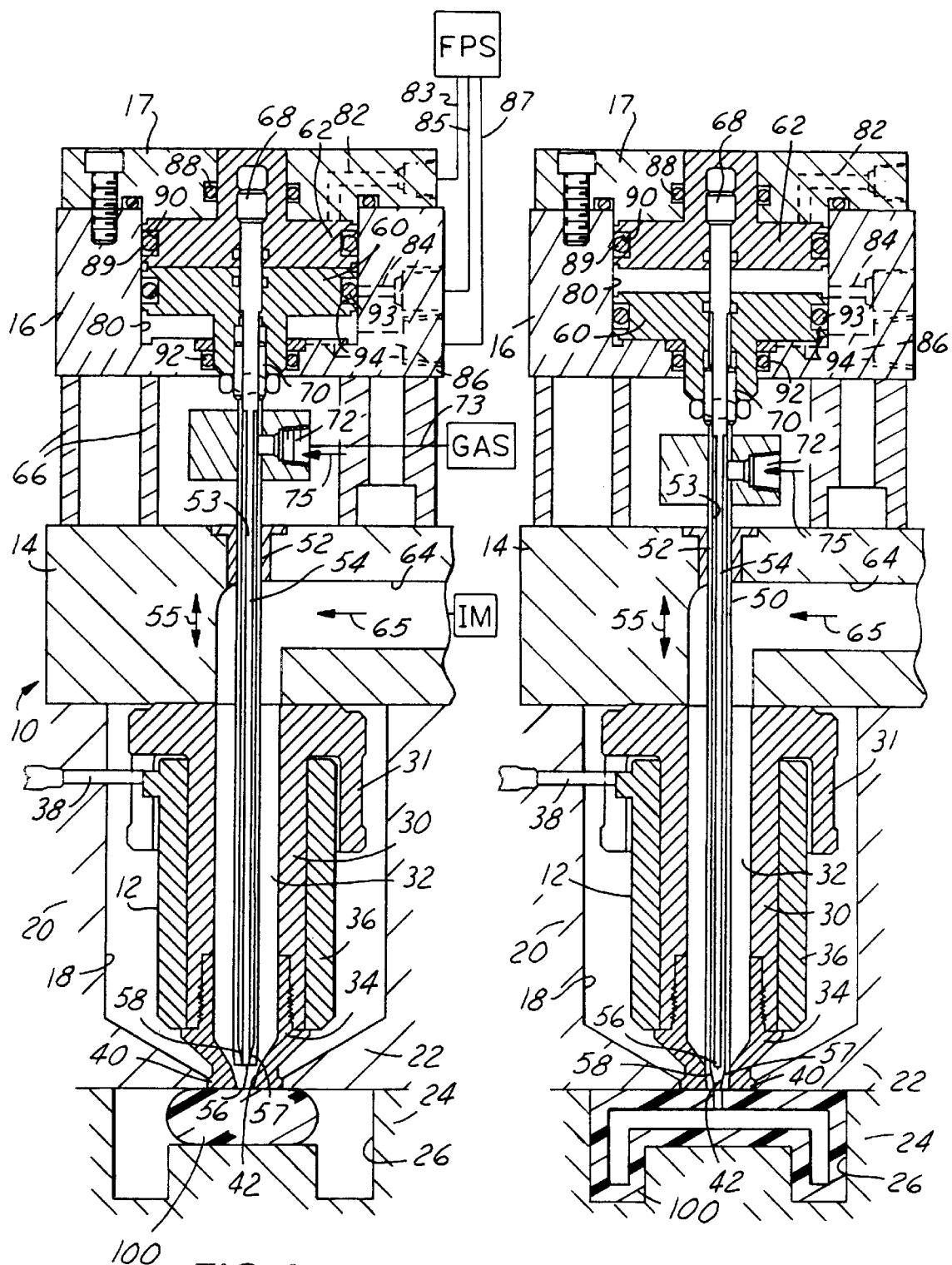
FIGS. 1–3 and 3A illustrate a preferred embodiment of the present invention, and also depict the operation thereof.

FIGS. 1–3 and 3A illustrate a preferred embodiment of the present invention and show its use in a fluid-assisted injection molding system. In this regard, the present invention is particularly adapted to be used in a gas-assisted injection molding process or system. However, the present invention is also adapted to be used with fluids other than gas, such as a gas in a liquid state (e.g. liquid nitrogen) or other liquids under pressure. Moreover, it is possible to use the present invention in a co-injection molding system which injects two different plastic materials, one for an inner core and the other for an outer shell, into a single mold cavity.

Since the preferred use of the present invention relates to gas-assisted injection molding systems, it will be referred to herein in that manner. However, for the reasons set forth above, it is to be understood that the use of the term "gas" herein is not meant to be limiting relative to the invention.

Also, the present invention is preferably adapted for use with sprue bushings or nozzles. In this regard, the invention is shown in this application for use with one type of sprue bushing 12. Of course, other sizes, shapes and types of sprue bushings, machine nozzles, and the like can be used with the present invention and fall within the spirit and scope thereof. In addition, the present invention can be used without a sprue bushing.

The valve-gate system is generally referred to by the reference numeral 10 in the drawings. The system 10 includes a bushing or nozzle 12, a manifold 14, and a cylinder member or block member 16. The mold bushing 12, which is also commonly referred to as a "nozzle," is mounted in a cavity 18 in a mold 20. The mold 20 can be of any conventional type and has a first plate member 22 which houses the bushing 12, as well as a second plate member 24 which has a mold cavity 26 therein. The mold cavity 26 is formed or machined in the size and shape of the final part to be produced, as is well known in the art.

The sprue bushing or nozzle 12 can be of any conventional type, such as those available from Incoe Corp., Troy, Mich. In this regard, the sprue bushing 12 has a metal body or shank member 30, an internal elongated passageway 32, a screw-on tip member 34, and an annular resistance heater member 36. The tip member 34 has a forward end 40 which is adapted to fit within the end of the recess 18. The tip 34 has an open end 42 through which plastic material is selectively allowed to flow into the mold cavity 26.

A movable central pin mechanism 50 is positioned in the sprue bushing 12. The pin mechanism 50 has an outer hollow pin member 52 and a central pin member 54 which preferably is solid, but could be tubular. The pin member 54 is movably positioned inside elongated passageway 53 in the outer pin member 52. As explained in more detail below, the two pin members 52 and 54 are adapted to be moved longitudinally (axially) and separately, together or relative to one another. The pin members are movable in the direction shown by arrows 55 in the drawings.

Outer pin 52 is secured to first piston member 60 while inner pin member 52 is connected to second piston member 62. Preferably, the pin members are releasably threadedly connected to the piston members so they can be adjusted where necessary, although the pin members could also be fixedly secured to the piston members.

The piston members 60 and 62 are positioned in block member 16 and held in position by cover plate 17. The two piston members 60 and 62 are adapted to be moved separately or together in the block 16, also in the direction of the arrows 55. The piston members 60 and 62 are adapted to be moved in the cylinder block 16 by any conventional means, preferably hydraulically or pneumatically. Also, it is possible, in accordance with the present invention, to provide an electrical system for moving the two piston members 60 and 62 in the desired manner and sequence. For example, the pistons could be mounted in Acme threads and either the pistons could be rotated or the surrounding housing could be rotated by an electric motor.

Molten plastic material is introduced to the system through passageway 64 in the manifold 14. The plastic material is introduced into the passageway by a conventional injection molding machine (shown schematically by box "IM"). The manifold 14 is heated by any conventional means, such as cartridge or tubular heaters (not shown). The passageway 64 allows the plastic material from the injection molding machine IM to be introduced into passageway 32 in the bushing and into the mold cavity 26. In this regard, the direction of flow of the plastic material is indicated by the arrow 65. Pillars or spacers 66 (also known as "risers") are positioned between the manifold 14 and block member 16. The block member, manifold and mold are typically secured or fastened together by any appropriate means, such as clamps, machine bolts, or the like, conventionally known in the art.

Figure 3:
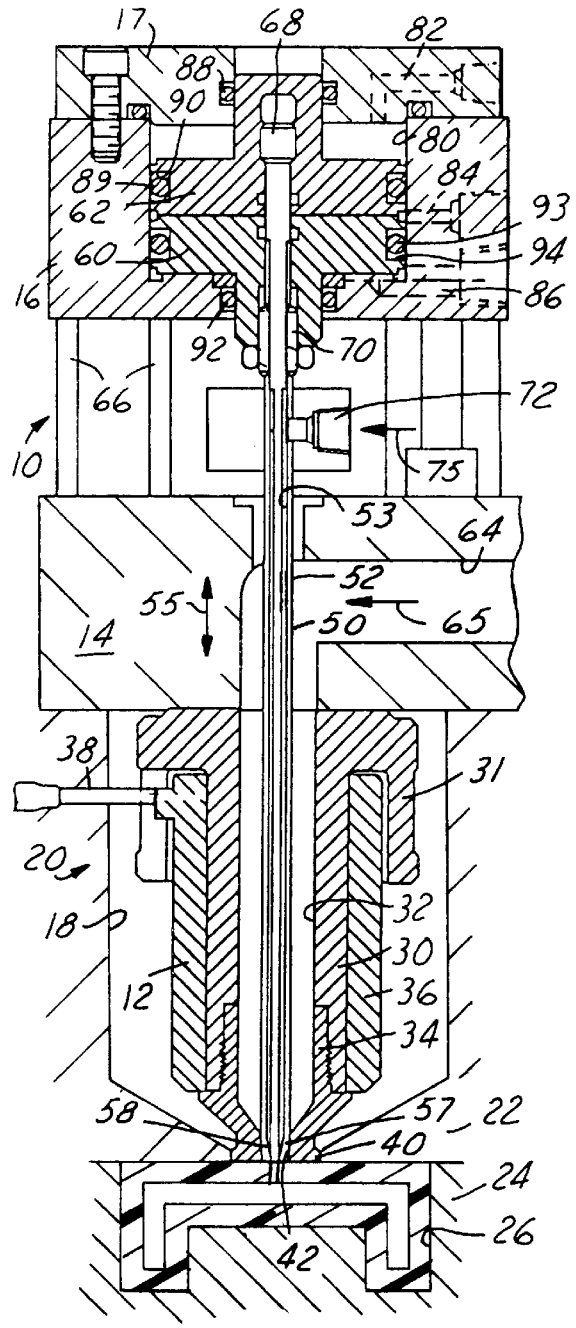

The bushing or nozzle 12 can be made of one or more pieces as desired. For example, as shown in the embodiment of FIGS. 1–3, the bushing 12 can have a head portion 31 which is produced integral with, or threadedly attached to, the body or shank member 30. The heater member 36 is positioned on the outer surface of the shank 30. The heater member, which preferably is a resistant-type heater, such as a coil heater or a band heater of any conventional type, is electrified through lead 38 connected to an appropriate power source (not shown). The heater member can be of any conventional type. In some situations, it may be possible to provide a bushing without a heater.

As indicated, the bushing can be a one-piece or multi-piece component device. The heater member also can be positioned internally or externally relative to the body or shank member 30. The bushing further can have any convenient or conventional shape or cross-section, and can be provided without a head portion. The bushing further can be of a type which is threadedly attached to the mold or manifold. All of these types of bushings and heater members are well known in the art.

The plastic material is heated and initially converted into a molten state in the barrel of an injection molding machine IM. The plastic material is then forced into the bushing, or, if a manifold is utilized such as shown in FIGS. 1–3, into and through the manifold and then into one or more bushings. In this regard, the heaters in the manifold 14 keep the plastic material in the manifold passageways 64 in a molten condition and the heater member (or members) in the bushing maintains the plastic material in the bushing passageway 32 in a molten condition. In this manner, after the injection cycle injects a quantity of plastic material into the mold cavity, the remaining plastic material in the bushing and manifold does not harden or solidify, but is retained in a liquid or molten condition ready for the next injection cycle.

The fluid (gas) is introduced into the mold cavity 26 through passageway 53 in the pin mechanism 50. The gas is introduced into the system 10 from a conventional pressure source "gas" to the coupling 72. An appropriate conduit 73 is used to supply the gas to the coupling 72 from the pressure source. The direction of entry of the gas into the system 10 is shown by the arrow 75. The gas is introduced to the coupling 72 and, in turn, to the pin mechanism 50 and into the mold cavity 26.

As shown by comparison of FIGS. 1 and 2, the inner pin member 54 can be moved longitudinally or axially relative to the outer pin member 52. The lower or distal end 56 of the inner pin member 54 is adapted to mate with the inner lower end 58 of the passageway 53 in the pin member 52. The lower ends 56 and 58 form a valve or gate which controls the flow of gas from the passageway 53 into the mold cavity 26.

The inner pin member 54 is securely attached to piston member 62. In this regard, the pin member 54 is preferably threadedly secured to the piston member 62 by a threaded joint or connector mechanism 68. Similarly, the outer pin member 52 is connected to piston member 60 by an appropriate coupling 70.

The piston members 60 and 62 are slidably positioned in chamber cavity 80 in the block member 16. Fluids, such as liquids or gases, are introduced into the cavity 80 by channels 82, 84 and 86 as desired, and provide movement of the pistons 60 and 62.

A plurality of seals are provided between the piston members 60 and 62 and the block member 16 in order to separate and isolate the fluids or gases being introduced into the cavity 80 by the passageways 82, 84 and 86. These seals can be of any conventional type, such as rubber or elastomer O-rings. In this regard, piston member 62 is sealed by seals 88 and 89. Seal 88 is positioned on cover plate 17, while seal 89 is positioned in annular cavity 90 in piston member 62. Piston member 60 is sealed by sealing members 92 and 93. Sealing member 92 is positioned in block member 16, while seal 93 is positioned in cavity 94 in piston member 60.

The hydraulic or pneumatic fluid or gas is supplied to the passageways 82, 84 and 86 by conduits 83, 85 and 87, respectively, from one or more conventional hydraulic or pneumatic power sources "FPS". The passageways can all be connected to the same pressure source and selectively utilized by an appropriate valving and control system. The conduits are connected to the block member 16 and cover plate 17 by any appropriate connectors or fasteners. The passageways 82, 84 and 86 are machined or provided in the cylinder block and cover plate in the positions shown in FIGS. 1–3, although it is understood that they can be provided in other locations within the skill of persons in the art.

The lower end 57 of outer pin member 52 is adapted to mate with the opening (orifice) end 42 of the bushing 12 and form a valve mechanism. The members 57 and 42 mate together to form a valve which regulates the flow of plastic material into the mold cavity 26 from the passageway 32.

When the system 10 as shown in FIGS. 1–3 is used, the valve or gate formed by members 42 and 57 is initially opened, as shown in FIG. 1. In this condition, plastic material which is present in the manifold 14 and bushing 12 is allowed to enter into the mold cavity 26. During this stage of the process, the two pin members 52 and 54 are positioned in the manner shown in FIG. 1 which prevents plastic from being introduced into the passageway 53. For this part of the process, the two piston members 60 and 62 are forced into the upper part of chamber 80 by entry of pressurized gas or fluid through passageway 86 into the chamber 80. This forces the two pistons together and to the position shown in FIG. 1.

Once the requisite amount of plastic material 100 is introduced into the mold cavity 26, the pressurized gas in chamber 80 from passageway 86 is removed or relieved, and liquid or gas is introduced under pressure into cavity 80 through passageway 84. When pressurized fluid is introduced into cavity 80 through passageway 84, the piston members 60 and 62 are divided or separated and forced into the positions in cavity 80 shown in FIG. 2. This causes the end 57 of outer pin 52 to be seated in the opening in end 42 and thereby close the entry of plastic material from bushing 12 into the mold cavity 26. At the same time, this procedure also opens the gate or valve between end 56 and inner lower end 58 of pin 52 allowing gas under pressure to be introduced through connector 72 into annular passageway 53 and in turn into the mold cavity 26. The gas or fluid introduced into the mold cavity 26 pushes the plastic material 100 into all areas of the mold cavity, completely filling it, as shown in FIG. 2.

The specific pressures utilizes and process steps for the gas-assisted injection molding process are well-known in the art and any conventional process can be utilized. The present invention is adapted to be used with any type of conventional gas-assisted injection molding processes. In this regard, the gas or fluid can be introduced into the mold cavity during the flow of plastic into the cavity, after the plastic material 100 has been deposited in the cavity, or in any combination thereof. For example, as shown in FIGS. 1 and 2, an initial amount of plastic material 100 can be introduced into the mold cavity, then gas or fluid at a first pressure can be introduced into the cavity, and, if desired, the same or different gas or fluid can be introduced at the same or at a different pressure—also through connector 72. The introduction of the gas or fluid(s) into the mold cavity along with or subsequent to the plastic material, pushes the plastic material into all areas of the mold, completely filling the cavity.

Figure 3A:
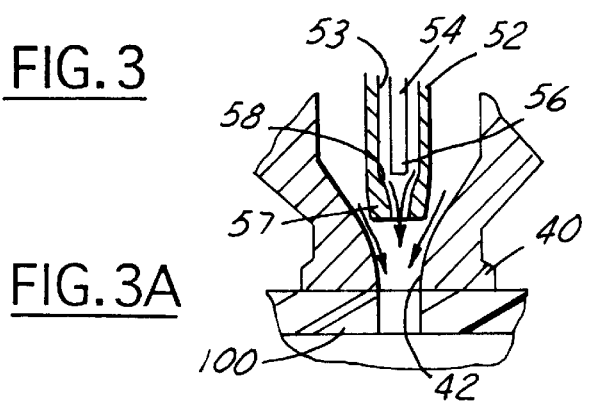

Although the present invention is described herein with reference to the particular system shown in FIGS. 1 and 2 whereby all of the plastic material is introduced first into the mold cavity and the gas or fluid introduced thereafter, it is also understood that the operation of the pistons 60 and 62 could be regulated such that the gas or fluid could be introduced along with a portion of the plastic material into the mold cavity. FIG. 3A depicts one step in the operation of the invention in this manner. For this purpose, a control system could be devised which would regulate the positioning of the piston members 60 and 62 in order to satisfy those processing parameters.

Once the requisite amount of plastic material 100 and gas are introduced into the mold cavity 26, both of the valve members are closed at the entrance into the mold cavity. This is shown in FIG. 3. For this step, the pressurized fluid or gas is removed or released from cavity 80 through conduit 84, and pressurized fluid or gas is introduced into cavity 80 through passageway 82. This moves piston member 62 into contact with piston member 60 and at the same time moves the end 56 of pin member 54 into engagement with the inner end 58 of pin member 54, closing the gas valve or gate.

In accordance with standard gas-assisted injection molding techniques, after the requisite amounts of gas and plastic are introduced into a mold, the pressure of the gas is maintained to compensate for any volumetric shrinkage of the plastic as it cools and solidifies. The positions of the members of the system 10, as shown in FIG. 3, can be utilized to satisfy this step. Also, for cooling, the mold members 22 and 24 are typically cooled by circulation of a coolant through appropriate channels or passageways (not shown) which assist in solidifying the plastic.

Once the plastic part in the mold 26 has solidified sufficiently, the gas within the molded part is vented to atmosphere in any conventional manner, and the part is ejected from the mold cavity. In accordance with the present invention, the gas could be vented from the molded part by reversing the processing step shown in FIG. 2 which opens the valve between members 56 and 58. Other conventional methods could be used to vent the gas in the mold part, however, such as a vent pin mechanism in the mold.

The gas which preferably is utilized with the present invention is nitrogen, but it can be any other gas or fluid utilized with conventional gas-assisted injection molding processes. Also, if desired, the gas which is removed or vented from the mold after the molding cycle, can be collected, reclaimed and reused. In this regard, it is preferable to provide a filter mechanism in the gas return or exhaust passageway in order to remove any foreign or plastic particles.

Virtually all of the members of the system 10, with the exception of the seals, are made from a metal material, such as steel. Of course, any other conventional materials used in injection molding systems or gas-assisted injection molding systems can be utilized so long as they meet the requirements of the present invention.

Although a particular sequence of processing steps are described above with reference to FIGS. 1, 2 and 3, it is also understood that the invention can be utilized with processing or method steps in a different sequence. In one preferred process, the system 10 is operated in the manner discussed above, namely the operations shown in FIGS. 1, 2 and 3 in sequence. However, in another preferred embodiment, the system 10 can be utilized in a sequence as follows: The operations shown in FIG. 1, FIG. 3, FIG. 2, and then FIG. 3 again. Moreover, when a system is used which allows gas to be introduced along with a portion of the plastic material into the mold cavity, then an appropriate sequence of processing steps can be as follows: FIG. 1, FIG. 2, FIG. 3A, and then FIG. 3. Another alternate sequence could be: FIG. 1, FIG. 2, FIG. 3, FIG. 3A, FIG. 2, and then FIG. 3 again.

Figure 4:
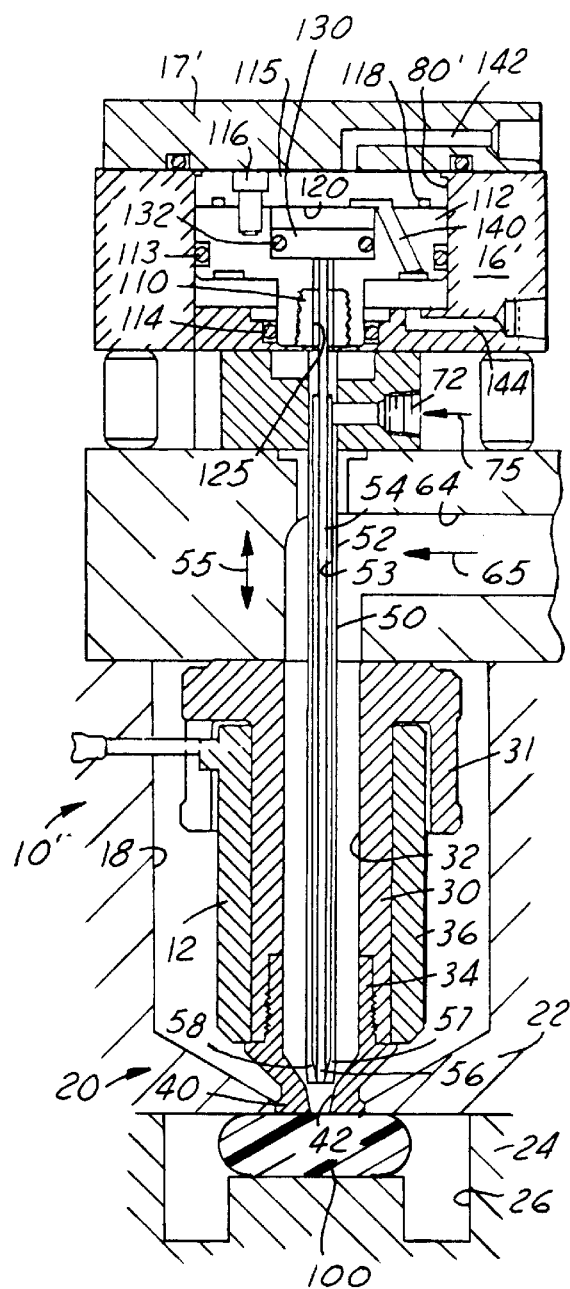
FIGS. 4–6 illustrate an alternate embodiment of the present invention, as well as depicting the operation thereof.
Figure 5:
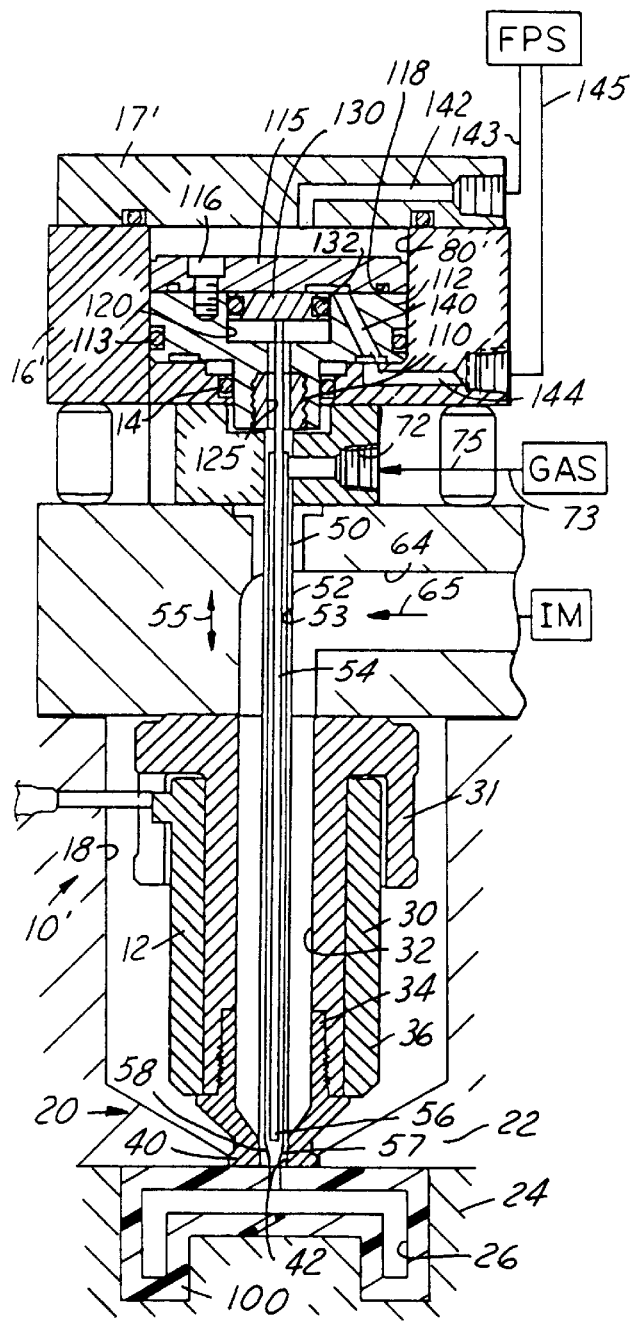
Figure 6:
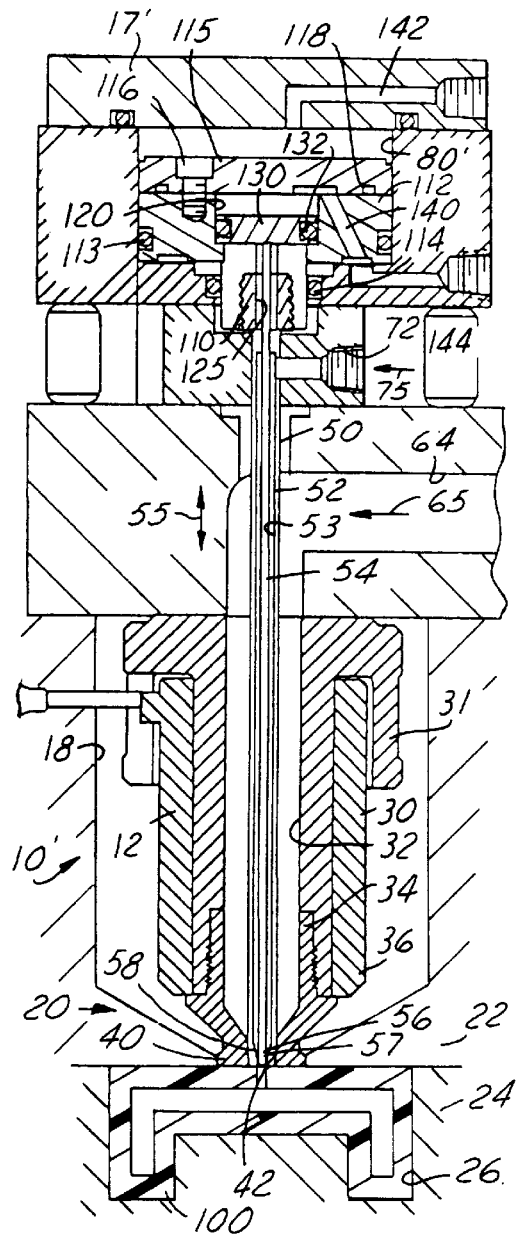

An alternate embodiment 10' of the present inventive system and apparatus is shown in FIGS. 4–6. The main difference between the embodiment 10' shown in FIGS. 4–6 from the embodiment 10 shown in FIGS. 1–3 is the construction of the piston members which operate the pin members. The operation of the pin members in the control of the plastic and gas materials into the mold cavity, as well as all the other features of the bushing, manifold, mold and hydraulic and/or pneumatic systems are the same for all of the embodiments and thus are indicated by the same reference numerals. Also, some of the features which have minor differences between the embodiments are sometimes referred to by the same reference numbers followed by a "prime". See, for example, block member 16' and cover plate 17' in FIGS. 4–6.

In the embodiment shown in FIGS. 4–6, the outer pin member 52 is connected by a conventional (preferably threaded) connector mechanism 110 to piston member 112. A cavity 120 is provided in the piston member 112. The piston member 112 is sealingly and slidingly positioned in cavity 80' in cylinder block 16'. Sealing members 113 and 114 are used to sealingly position the piston member 112 in the cavity and block member. The piston member 112 has a cover member 115 attached to it in a conventional manner such as by fastener 116, thus providing a two-piece piston assembly. Seal 118 is used to sealingly secure the plate 115 to the piston member 112.

The solid inner pin member 54 is provided integral with or securely attached to piston member 130. Piston member 130 is sealingly and slidably positioned in cavity 120 in piston member 112. For this purpose, seals 132 are provided on the piston member 130.

Passageway 140 is provided in piston member 112 and cover member 115. Passageway 140 is used to equalize the pressure in chamber 80' with the pressure in chamber 120, as desired.

Passageways 142 and 144 are used to supply pressurized fluids (liquids or gases) from separate or common pressurized fluid sources (FPS) into cavity 80' in cylinder member 16'. The fluid is conveyed to the passageways 142 and 144 by conduits 143 and 145, respectively.

When pressure is introduced into cavity 80' through passageway 144, the piston member 112 is forced to the uppermost part of the cavity 80'. This is shown in FIG. 4. Also, at the same time, pressurized fluid is introduced into chamber 120 through passageway 140 and this, in turn, forces piston member 130 to its lowermost position in cavity 120. This condition shown in FIG. 4 results in the opening of the valve in end 42, while the valve or gate formed between end 56 and inner surface member 58 remains closed. Thereafter, when the pressurized fluid in passageway 144 is released or removed, and pressure is introduced through passageway 142 into chamber 80', the piston member 112 is moved to its lowermost position in cavity 80' which closes the opening in end 42, as shown in FIG. 5. At the same time, with the pressure being released or removed through passageway 144, the pressure in chamber 120 is also relieved allowing the piston 130 to move to its uppermost position in chamber 120. This opens the gas passageway 53 between pins 52 and 54 and allows introduction of gas into the mold cavity 26. The introduction of gas through connector 72 into elongated passageway 53 also forces gas through passageway 125 into chamber 120. This assists in moving the piston 130 in a direction towards the top of chamber 120, as shown in FIG. 5.

When it is desired to move pin 54 to its closed position with end 56 mating with valve seat 58, then pressure through connector 72 is reduced or relieved, while at the same time, pressure is introduced through passageway 144 through passageway 140 and into chamber 120. This moves piston 130 to the position shown in FIG. 6. At the same time, sufficient pressure is maintained in passageway 142 and in the upper portion of chamber 80' in order to maintain the piston 112 in its lowermost position.

The operation of the system 10' shown in FIGS. 4–6 with gas-assisted systems is similar to the operation of the system 10 in FIGS. 1–3 and 3A. The sequence of processing steps can also be modified in the same manner in order to meet the specifications and requirements of the particular gas-assisted injection molding system preferred to be utilized. In this regard, regulation of the pressurized fluids in passageways 142 and 144, in combination with entry of plastic material through passageway 53 and passage of gas-assisted fluid or materials through connector 72 are coordinated and regulated to meet the desired requirements.

While the above description describes the preferred embodiments of the invention, those skilled in the art will realize that changes and modifications may be made thereto without departing from the spirit and scope of the invention. The invention is intended to claim all such changes and modifications that fall within the true scope of the invention as defined and covered by the following claims.

What is claimed is:

1. A valve-gate mechanism for use in a gas-assisted injection molding process, said mechanism comprising:

a bushing member having a first passageway and a first valve seat;

a hollow pin member movably positioned in said first passageway and having a first valve member for mating with said first valve seat to form a first valve means for closing off the passage of plastic material through said first passageway;

said hollow pin member having a second passageway and a second valve seat positioned in said second passageway;

an inner pin member movably positioned in said second passageway and having a second valve member for mating with said second valve seat to form a second valve means for closing off the passage of gas through said second passageway;

said hollow pin member and said inner pin member both being adjustable longitudinally;

a first piston member connected to said hollow pin member;

a second piston member connected to said inner pin member; and wherein said first and second piston members are capable of being completely separated from one another and are adapted to be moved either together or independently of each other in order to selectively open and close said first and second valve means.

2. The valve-gate mechanism of claim 1 further comprising a connector mechanism for supplying gas into said second passageway.

3. The valve-gate mechanism of claim 1 wherein said bushing member is a heated sprue bushing.

4. A system for gas-assisted injection molding, said system comprising:

a mold having a mold cavity;

a source of molten plastic material for being supplied into said mold cavity;

a bushing member positioned in said mold and having a first passageway and a first valve seat for supplying said plastic material into said mold cavity;

a block member having a fluid cavity therein, a plurality of passageways in fluid communication with said fluid cavity, and a first pressurized fluid source;

a first pin member movably positioned in said first passageway and having a first valve member for mating with said first valve seat to form a first valve means, said first pin member having a second elongated passageway therein and a second valve seat thereon;

a second pin member movably positioned in said second passageway and having a second valve member for mating with said second valve seat to form a second valve means;

a first piston member connected to said first pin member and movably positioned in said fluid cavity in said block member;

a second piston member connected to said second pin member and also movably positioned in said fluid cavity in said block member;

said first and second piston members being capable of being separated completely from one another in said fluid cavity during operation of said system;

a pressurized gas source for supplying pressurized gas into said second passageway in said first pin member; and a manifold member positioned between said bushing member and said block member, said manifold member having a third passageway for introduction of plastic material into said bushing, and said manifold member being physically separated from said block member;

wherein said first and second piston members are adapted to be moved in said fluid cavity by said first pressurized fluid source and, in turn, move the first and second pin members in order to regulate the flow of pressurized gas in said second passageway into said mold cavity and the flow of said plastic material from said first passageway into said mold cavity.

5. The system of claim 4 further comprising sealing members for separately sealing said first and second piston members within said fluid cavity.

* * * * *